US012764224B2

(12) United States Patent
Gavie et al.

(10) Patent No.: US 12,764,224 B2
(45) Date of Patent: Oct. 13, 2026

(54) POST-CALL IMAGE SHARING VIA SECONDARY DISPLAY OF ELECTRONIC DEVICE

(71) Applicant: Samsung Electronics Co., Ltd., Suwon-si (KR)

(72) Inventors: Dan P. Gavie, Brooklyn, NY (US); Jamar A. Bromley, Brooklyn, NY (US); Woo Ram Jeon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 859 days.

(21) Appl. No.: 18/150,073

(22) Filed: Jan. 4, 2023

(65) Prior Publication Data

US 2024/0223695 A1 Jul. 4, 2024

(51) Int. Cl.

| | |
|---|---|
| ***H04M 1/72484*** | (2021.01) |
| ***H04M 1/72454*** | (2021.01) |
| ***H04M 1/72469*** | (2021.01) |
| *H04M 1/02* | (2006.01) |

(52) U.S. Cl.

CPC ... *H04M 1/72484* (2021.01); *H04M 1/72454* (2021.01); *H04M 1/72469* (2021.01); *H04M 1/0216* (2013.01)

(58) Field of Classification Search

CPC ......... H04M 1/72484; H04M 1/72454; H04M 1/72469; H04M 1/0216; H04M 1/72439; H04M 1/0214; H04M 1/0245; H04M 2250/16

See application file for complete search history.

(56) References Cited

U.S. PATENT DOCUMENTS

| | | | | |
|---|---|---|---|---|
| 9,830,075 B2 | 11/2017 | Kim et al. | | |
| 10,338,774 B2 | 7/2019 | Cho | | |
| 11,126,223 B2 | 9/2021 | Seo et al. | | |
| 11,159,470 B1 * | 10/2021 | Botwick | H04L 51/212 | |
| 2009/0290688 A1 * | 11/2009 | Peters | H04W 76/50 | 379/37 |
| 2012/0196583 A1 * | 8/2012 | Kindo | H04M 1/6091 | 455/420 |
| 2014/0051406 A1 * | 2/2014 | Kim | H04W 4/16 | 455/414.1 |
| 2016/0026381 A1 * | 1/2016 | Kim | G06F 3/04817 | 715/761 |
| 2016/0205245 A1 * | 7/2016 | Kim | H04M 19/041 | 455/414.1 |
| 2016/0378277 A1 * | 12/2016 | Cho | G06F 3/04886 | 715/814 |

(Continued)

FOREIGN PATENT DOCUMENTS

KR 20150137436 A 12/2015

*Primary Examiner* — Angelica Perez

(57) ABSTRACT

A method includes detecting a closure of an electronic device that ends a communication session involving a user of the electronic device. The method also includes displaying, on an external display of the electronic device viewable when the electronic device is closed and based on a context associated with at least one of the electronic device or the user, multiple images for selection by the user. In addition, the method includes receiving a selection by the user of at least one of the displayed images and initiating transmission of the at least one selected image to another electronic device associated with another party involved with the communication session.

20 Claims, 11 Drawing Sheets

(56) References Cited

U.S. PATENT DOCUMENTS

| | | | | |
|---|---|---|---|---|
| 2018/0342226 | A1* | 11/2018 | Shin | G06F 3/0487 |
| 2019/0272064 | A1* | 9/2019 | Ghassabian | G06F 3/011 |
| 2020/0045004 | A1* | 2/2020 | Fried | H04L 51/18 |
| 2024/0045586 | A1* | 2/2024 | Chen | H04M 1/72469 |

* cited by examiner

POST-CALL IMAGE SHARING VIA SECONDARY DISPLAY OF ELECTRONIC DEVICE

TECHNICAL FIELD

This disclosure relates generally to electronic devices. More specifically, this disclosure relates to post-call image sharing via a secondary display of an electronic device.

BACKGROUND

Various types of foldable electronic devices, such as foldable smartphones, are entering the marketplace. A foldable smartphone often includes multiple displays, such as a larger display that is visible and used when the smartphone is opened and a smaller display that is visible and used when the smartphone is closed. In many instances, the foldable smartphones may be opened during phone calls, and the foldable smartphones can be closed to terminate the phone calls.

SUMMARY

This disclosure relates to post-call image sharing via a secondary display of an electronic device.

In a first embodiment, a method includes detecting a closure of an electronic device that ends a communication session involving a user of the electronic device. The method also includes displaying, on an external display of the electronic device viewable when the electronic device is closed and based on a context associated with at least one of the electronic device or the user, multiple images for selection by the user. In addition, the method includes receiving a selection by the user of at least one of the displayed images and initiating transmission of the at least one selected image to another electronic device associated with another party involved with the communication session.

In a second embodiment, an electronic device includes an internal display viewable when the electronic device is opened and an external display viewable when the electronic device is closed. The electronic device also includes at least one processing device configured to detect a closure of the electronic device that ends a communication session involving a user of the electronic device. The at least one processing device is also configured to display, on the external display and based on a context associated with at least one of the electronic device or the user, multiple images for selection by the user. In addition, the at least one processing device is configured to receive a selection by the user of at least one of the displayed images and initiate transmission of the at least one selected image to another electronic device associated with another party involved with the communication session.

In a third embodiment, a non-transitory computer readable medium contains instructions that when executed cause at least one processor of an electronic device to detect a closure of the electronic device that ends a communication session involving a user of the electronic device. The non-transitory computer readable medium also contains instructions that when executed cause the at least one processor to display, on an external display of the electronic device viewable when the electronic device is closed and based on a context associated with at least one of the electronic device or the user, multiple images for selection by the user. In addition, the non-transitory computer readable medium contains instructions that when executed cause the at least one processor to receive a selection by the user of at least one of the displayed images and initiate transmission of the at least one selected image to another electronic device associated with another party involved with the communication session.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 8B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, various types of foldable electronic devices, such as foldable smartphones, are entering the marketplace. A foldable smartphone often includes multiple displays, such as a larger display that is visible and used when the smartphone is opened and a smaller display that is visible and used when the smartphone is closed. In many instances, the foldable smartphones may be opened during phone calls, and the foldable smartphones can be closed to terminate the phone calls.

This disclosure provides various techniques for post-call image sharing via a secondary display of an electronic device. As described in more detail below, an electronic device (such as a foldable smartphone or other foldable electronic device) can be used by a user to participate in a communication session (such as a voice telephone call, video call, or other communication session). If and when the user closes the electronic device (such as to end the communication session), the closure of the electronic device can be detected. The user of the electronic device may then be allowed to select one or more images (such as at least one GIF file or other image file) for sharing with another party involved in the communication session. At least one of the multiple images may be identified as a possible selection option based on a context associated with the electronic device and/or the user. The images can be displayed on an external display of the electronic device, where the external display is viewable when the electronic device is closed. After selection by the user of one or more of the displayed images, the selected image(s) can be transmitted from the electronic device to another electronic device associated with the other party involved with the communication session.

In this way, the disclosed techniques allow a user to quickly and easily select and send images to other people after the conclusion of phone calls or other communication sessions. This can be accomplished without requiring the user to reopen his or her electronic device, navigate to an image search function, locate a suitable image, copy the image into a messaging application, and send a message to another user. This is one example of a new type of functionality that can be enabled in foldable electronic devices that include external displays viewable when the foldable electronic devices are closed.

Figure 1:
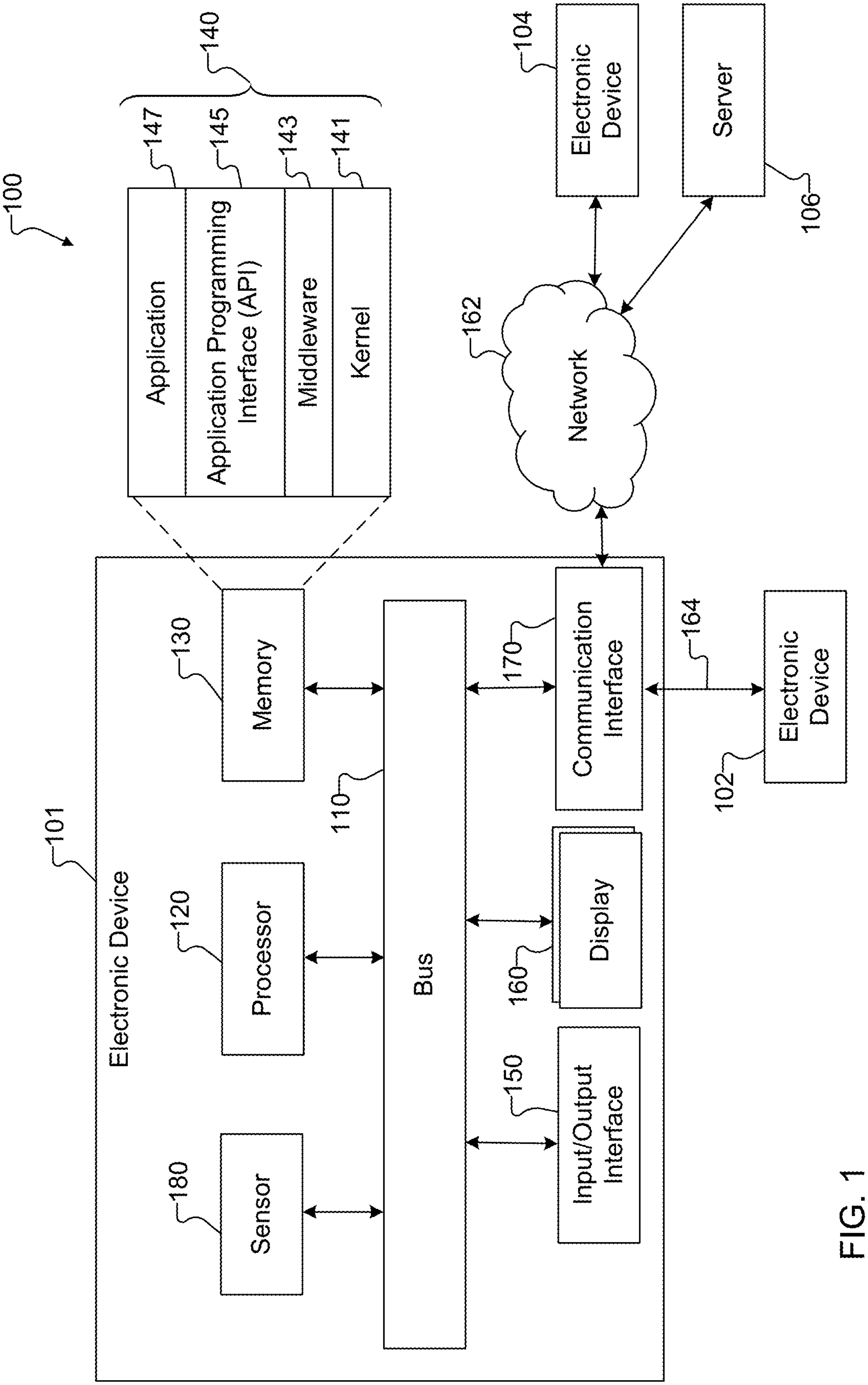
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can represent a foldable electronic device, meaning the electronic device 101 may have an opened configuration in which the electronic device 101 is larger and a closed configuration in which the electronic device 101 is smaller or more compact. The electronic device 101 can include at least one of a bus 110, a processor 120, a memory 130, an input/output (I/O) interface 150, multiple displays 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to support post-call image sharing via a secondary display 160 of the electronic device 101.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for post-call image sharing via a secondary display 160. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

Each display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. Each display 160 can also be a depth-aware display, such as a multi-focal display. Each display 160 is able to display, for example, various contents (such as text, images, videos, icons, or symbols) to the user. Each display 160 can include a touchscreen and may receive, for example, a touch, gesture, proximity, or hovering input using an electronic pen or a body portion of the user. As described below, a primary display 160 may be viewed when the electronic device 101 is opened, and a secondary display 160 may be viewed when the electronic device 101 is closed. Of course, the secondary display 160 may be viewed when the electronic device 101 is opened. However, a user's focus will typically be on the primary display 160 when the electronic device 101 is opened and actively being used.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th Generation (5G) wireless system, millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to support post-call image sharing via a secondary display 160 of the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIGS. 2A through 2H illustrate an example process for post-call image sharing via a secondary display of an electronic device in accordance with this disclosure. For ease of explanation, the process shown in FIGS. 2A through 2H is described as being implemented on or supported by the electronic device 101 in the network configuration 100 of FIG. 1. However, the process shown in FIGS. 2A through 2H could be implemented on or supported by any other suitable device(s) and in any other suitable system(s).

As shown here, the process in FIGS. 2A through 2H involves the use of the electronic device 101, which in this example is foldable between an opened configuration (shown in FIG. 2A) and a closed configuration (shown in FIGS. 2B through 2H). In the opened configuration, the electronic device 101 is generally longer and thinner. In the closed configuration, the electronic device 101 is generally shorter and thicker. In this example embodiment, the electronic device 101 includes a primary display 160*a* and a secondary display 160*b*. The primary display 160*a* may generally represent a larger display or other display that is used when the electronic device 101 is in the opened configuration. For example, the primary display 160*a* may only be viewable or visible when the electronic device 101 is opened. The secondary display 160*b* may generally represent a smaller display or other display that is used when the electronic device 101 is in the closed configuration. For instance, the secondary display 160*b* may represent an external display that is visible regardless of whether the electronic device 101 is opened or closed (although a user may typically focus on the primary display 160*a* when the electronic device 101 is opened and in use as noted above).

Figure 2C:
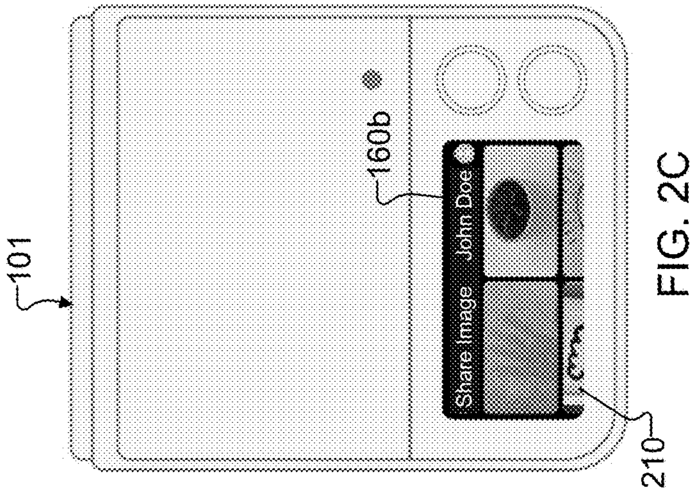
FIGS. 2A through 2H illustrate an example process for post-call image sharing via a secondary display of an electronic device in accordance with this disclosure.
Figure 2B:
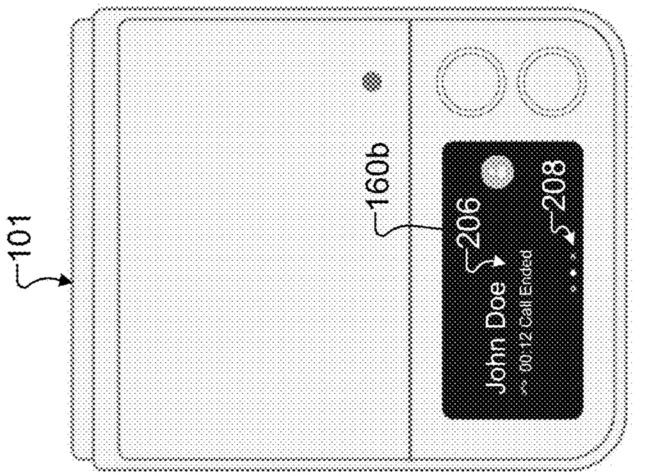
Figure 2A:
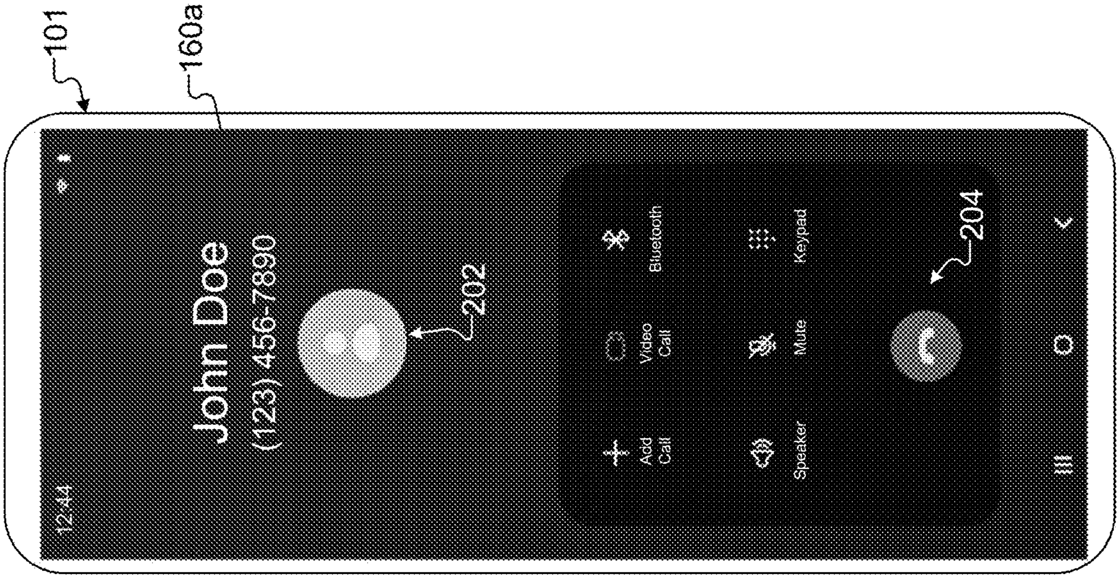

As shown in FIG. 2A, the electronic device 101 is being used during an active communication session, such as an active voice call. During the active communication session, the primary display 160*a* may present information 202 about the active communication session, such as the name of at least one other party involved in the active communication session and an icon representing or associated with that other party. The primary display 160*a* may also present a number of controls 204 for the active communication session. The controls 204 may, for instance, allow the user of the electronic device 101 to add another party to the communication session, initiate a video call with another party, control a BLUETOOTH or other wireless connection associated with the communication session or the electronic device 101, and control whether a speaker is used during the communication session. The controls 204 may also allow the user of the electronic device 101 to mute the current communication session, display a keypad for use by the user during the communication session, or terminate the communication session. Note that the information 202 and controls 204 shown here are examples only and can vary depending on the implementation.

As shown in FIG. 2B, the user of the electronic device 101 may fold or otherwise close the electronic device 101. In some embodiments, closing the electronic device 101 during an active voice call or other active communication session can terminate the communication session. This assumes that the user does not manually terminate the communication session (such as via a suitable control 204) and that the other party does not terminate the communication session. As shown here, after closing of the electronic device 101 occurs, the secondary display 160*b* presents information 206 about the communication session. In this example, the information 206 includes an identification of the other party associated with the communication session, the icon associated with the other party, and the overall length or duration of the communication session. The secondary display 160*b* also includes an indictor 208 identifying the ability of the user to swipe left or right to view additional content. In some cases (as described below), the user may be given the option of viewing and selecting images for transmission to the other party associated with the communication session.

Figure 2D:
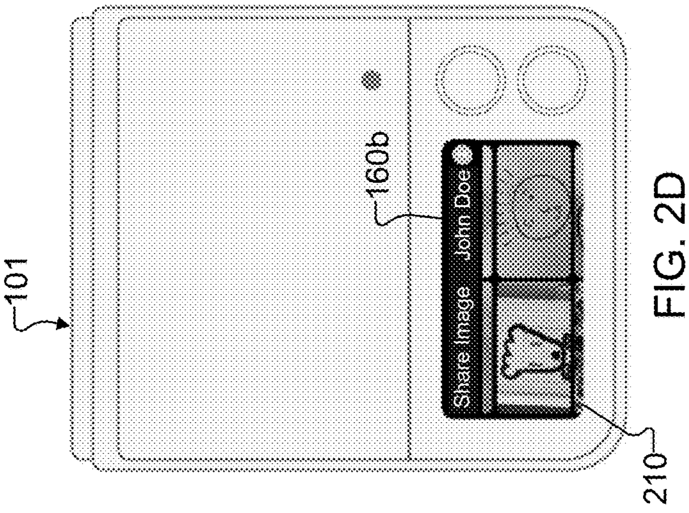

As shown in FIG. 2C, the user has selected the option for viewing and selecting images, such as by swiping left or right on the secondary display 160*b*. This causes the secondary display 160*b* to present multiple images 210 on the secondary display 160*b*. The electronic device 101 can obtain the images 210 presented on the secondary display 160*b* in any suitable manner. For example, as described below, the electronic device 101 can obtain the images 210 using one or more queries, where the queries are generated based on a context associated with the electronic device 101, the user of the electronic device 101, or both. The one or more queries can be used to obtain images stored locally on the electronic device 101 (such as in the memory 130), images stored remotely, or both. In this particular example, the images 210 are scrollable up and down so that the user can view additional images 210, which can update the displayed images 210 as shown in FIG. 2D.

Figure 2E:
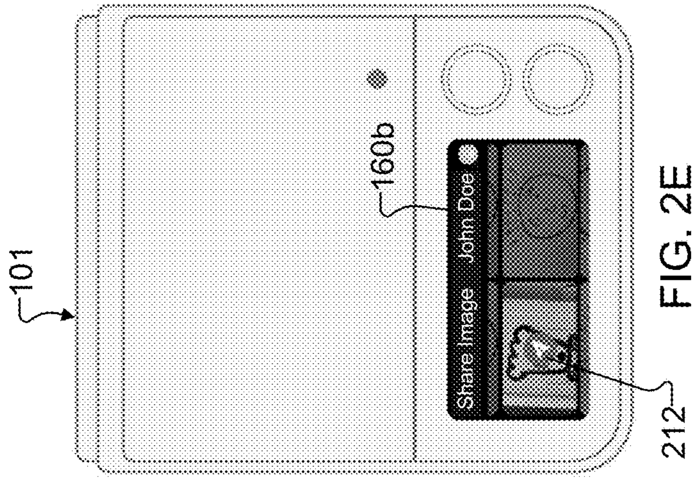

The user is able to select one or more of the displayed images 210, such as by tapping on at least one of the displayed images 210. As shown in FIG. 2E, after the user has selected at least one image, an icon 212 can be presented on the secondary display 160*b*. The icon 212 can be selected by the user, such as via tapping, in order to initiate transmission of the selected image(s) 210 to the other party associated with the communication session. In this example, the icon 212 takes the form of a circle with a paper airplane (symbolizing a send operation), although transmission of the selected image(s) 210 may be initiated in any other suitable manner.

Figure 2F:
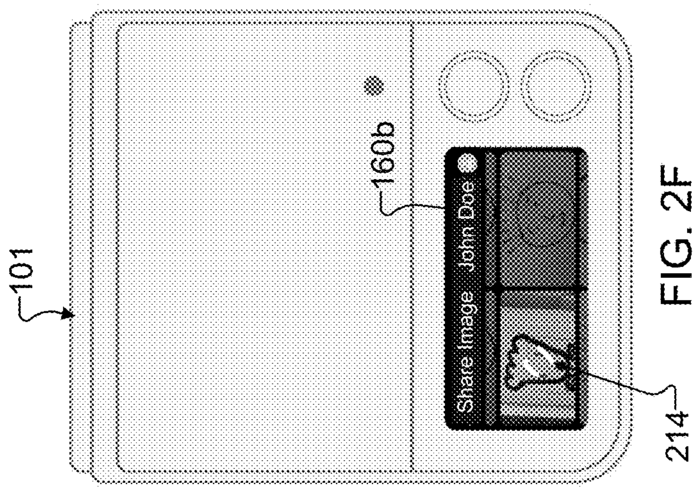
Figure 2H:
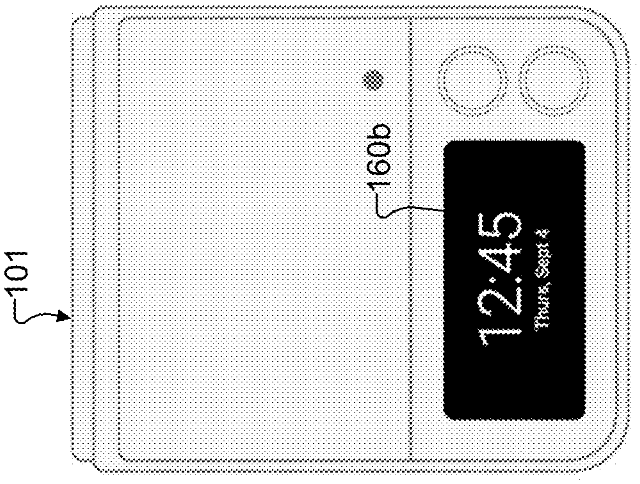
Figure 2G:
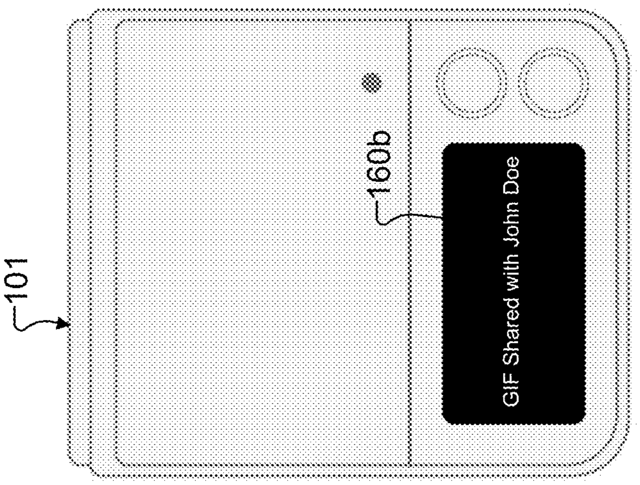

Once initiated, the icon 212 can be replaced by a sending symbol 214 as shown in FIG. 2F. Here, the sending symbol 214 includes circular arcs that rotate to illustrate that the transmission of the selected image(s) 210 is in progress. During this time, the electronic device 101 may attach the selected image(s) 210 to a text message or other message and initiate transmission of the message to an electronic device associated with the other party. The message can be sent to the electronic device associated with the other party directly or indirectly, such as via a text messaging service. Once the transmission of the selected image(s) 210 is completed, a confirmation can be presented on the secondary display 160*b* as shown in FIG. 2G. After some specified amount of time, an idle screen can be presented on the secondary display 160*b* as shown in FIG. 2H. Here, the idle screen includes the current time and date. Note that if the user elects not to pursue the option of sending images, the secondary display 160*b* may transition from the state shown in FIG. 2B to the idle screen shown in FIG. 2H.

Although FIGS. 2A through 2H illustrate one example of a process for post-call image sharing via a secondary display 160*b* of an electronic device 101, various changes may be made to FIGS. 2A through 2H. For example, the specific layouts and arrangements of the contents shown on the displays 160*a*-160*b* in FIGS. 2A through 2H are for illustration only. Also, various changes may be made to the operations shown in FIGS. 2A through 2H, such as when additional operations are added or existing operations are removed from the process.

Figure 3:
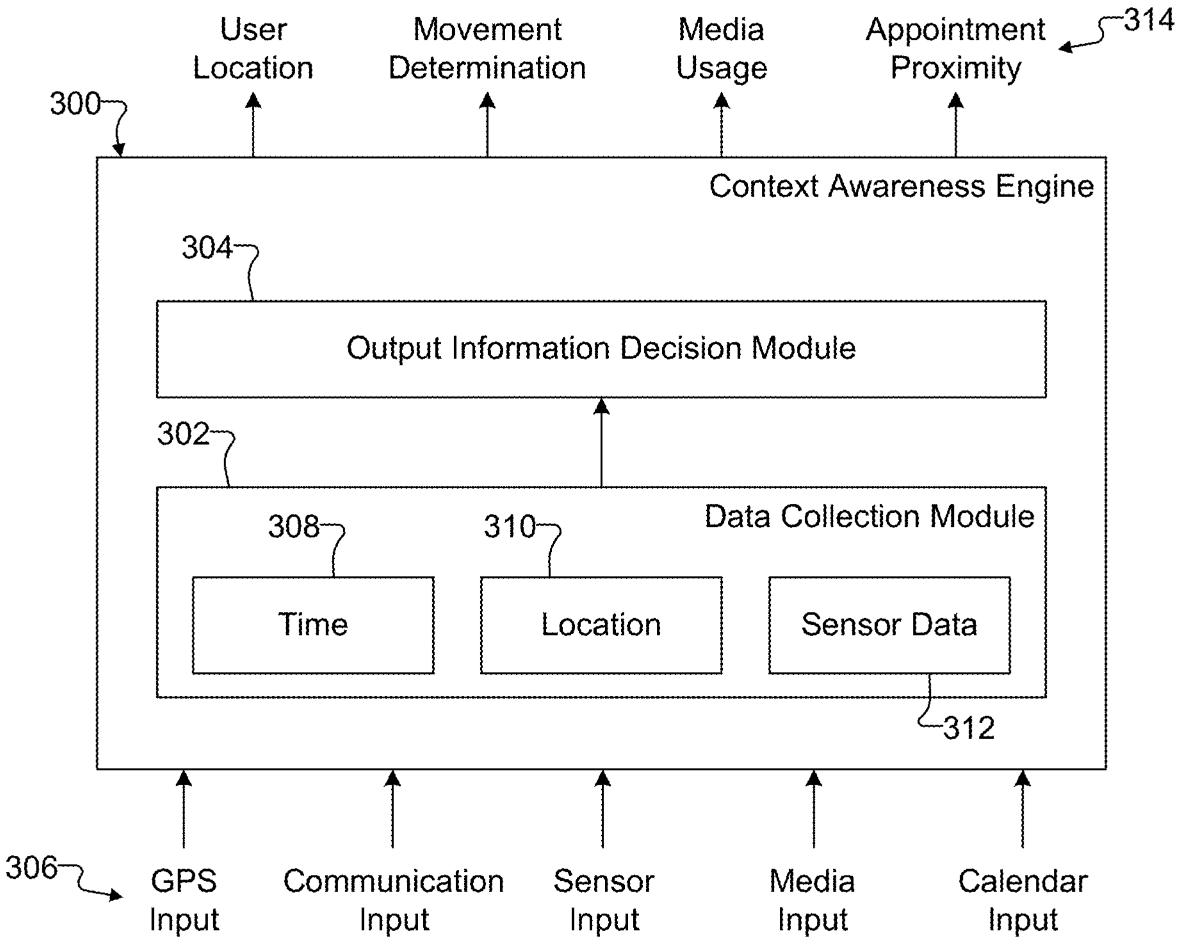
FIG. 3 illustrates an example process for identifying a context used during post-call image sharing via a secondary display of an electronic device in accordance with this disclosure.

FIG. 3 illustrates an example process for identifying a context used during post-call image sharing via a secondary display of an electronic device in accordance with this disclosure. For ease of explanation, the process shown in FIG. 3 is described as being implemented on or supported by the electronic device 101 in the network configuration 100 of FIG. 1. However, the process shown in FIG. 3 could be implemented on or supported by any other suitable device(s) and in any other suitable system(s).

As shown in FIG. 3, the electronic device 101 can support the use of a context awareness engine 300, which can be used to generate or otherwise obtain information associated with a context related to the electronic device 101, a user of the electronic device 101, or both. In this example, the context awareness engine 300 includes a data collection module 302 and an output information decision module 304. The data collection module 302 generally operates to collect information that is used to define or identify the context related to the electronic device 101 or the user of the electronic device 101. Here, the data collection module 302 can receive various inputs 306. In this example, the inputs 306 can include information defining GPS coordinates or other locations of the electronic device 101, communication inputs related to wireless or other communications involving the electronic device 101, and sensor inputs related to measurements from proximity or other sensors 180 of the electronic device 101. In some embodiments, the communication inputs may relate to BLUETOOTH or Wireless Local Area Network (WLAN) communications received by the electronic device 101. The inputs 306 can also include information defining audio or video media played by the electronic device 101, such as one or more songs, movies, television shows, podcasts, or streaming content that may have been recently played by the electronic device 101. The inputs 306 can further include information defining meetings, events, or other appointments as identified in a calendar of the user of the electronic device 101.

The data collection module 302 here includes a time submodule 308, a location submodule 310, and a sensor data submodule 312. The time submodule 308 generally operates to identify a current time, such as based on received GPS or other navigation signals or received WLAN or other wireless signals. The location submodule 310 generally operates to identify a current location and optionally prior locations or paths of the electronic device 101, such as based on received GPS or other navigation signals or received WLAN or other wireless signals. The sensor data submodule 312 generally operates to obtain sensor measurements from one or more sensors 180, such as proximity measurements from one or more proximity sensors.

The output information decision module 304 processes the information obtained or generated by the data collection module 302 (and optionally other information) in order to produce one or more contextual outputs 314 associated with the user or the electronic device 101. For example, the output information decision module 304 may process information in order to identify a current location of the user or electronic device 101, such as by generating an indication whether the user or electronic device 101 is located at the user's home or workplace. The output information decision module 304 may also process information in order to determine whether the user or electronic device 101 is moving and, if so, how it appears the user or electronic device 101 is moving. For instance, the output information decision module 304 may process changes in locations of the user or electronic device 101 in order to estimate whether the user appears to be walking, running, biking, or driving. The output information decision module 304 may further process information in order to determine media usage by the user, such as by identifying the most recent song, movie, television show, podcast, or streaming content played by the electronic device 101 for the user. In some cases, the output information decision module 304 may identify the song, movie, television show, podcast, or streaming content that was being played by the electronic device 101 immediately prior to a start of a communication session. In addition, the output information decision module 304 may process information in order to identify whether the current time is within a specified amount of time to an appointment in the user's calendar. As described below, this type of contextual information may be used to automatically identify one or more images 210 that can be presented to the user of the electronic device 101 on the secondary display 160*b* for selection.

Although FIG. 3 illustrates one example of a process for identifying a context used during post-call image sharing via a secondary display 160*b* of an electronic device 101, various changes may be made to FIG. 3. For example, while specific examples of inputs 306 and contextual outputs 314 are shown here, other or additional inputs 306 and/or other or additional contextual outputs 314 may be used in this process.

Figure 4:
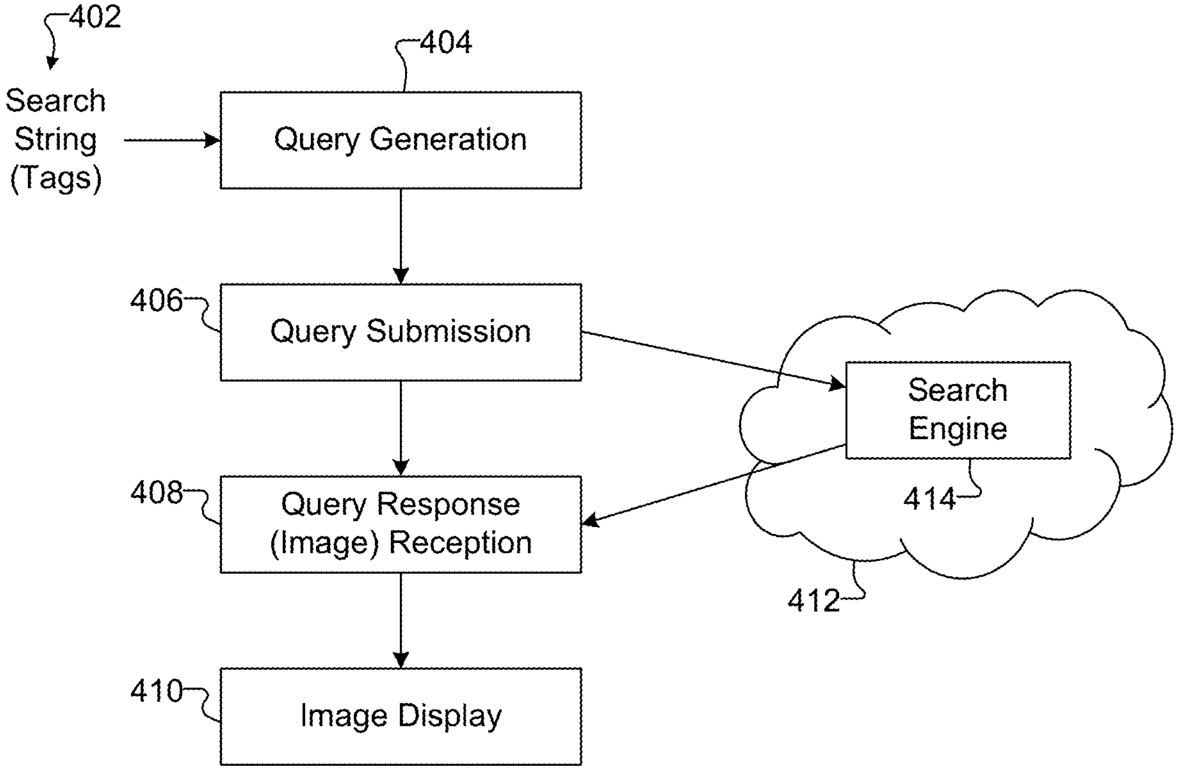
FIG. 4 illustrates an example process for image querying during post-call image sharing in accordance with this disclosure.

FIG. 4 illustrates an example process for image querying during post-call image sharing in accordance with this disclosure. For ease of explanation, the process shown in FIG. 4 is described as being implemented on or supported by the electronic device 101 and the server 106 in the network configuration 100 of FIG. 1. However, the process shown in FIG. 4 could be implemented on or supported by any other suitable device(s) and in any other suitable system(s).

As shown in FIG. 4, the electronic device 101 can generate one or more search strings 402, which can be used to search for images 210 to be presented to the user of the electronic device 101 via the secondary display 160*b* of the electronic device 101. As described below, each search string 402 may include one or more search tags, which may be based on (among other things) one or more of the contextual outputs 314 described above. The search string(s) 402 can be provided to a query generation function 404, which can convert the search string(s) 402 into a suitable format for querying images. Each resulting query is provided to a query submission function 406, which can submit the queries to one or more suitable destinations. A query response or image reception function 408 can receive images that are selected in response to the query, such as images 210 that are tagged or annotated with labels that match, are similar to, or otherwise satisfy the query. A display function 410 can be used to present at least some of the received images 210 on the secondary display 160*b* of the electronic device 101.

The images that are received in response to the query can be obtained from any suitable source(s). In this example, the query is communicated via a network 412 to an image search engine 414, which may be implemented using one or more servers 106. The image search engine 414 may have access to one or more collections of annotated or other images that can be searched. In some cases, the one or more collections of images may be extremely large and well-indexed so that images 210 containing any number of contents can be quickly and easily obtained. Note, however, that this is for illustration only and that images may be obtained in other ways.

Although FIG. 4 illustrates one example of a process for image querying during post-call image sharing, various changes may be made to FIG. 4. For example, images 210 may be obtained in any other suitable manner. As a particular example, a query may also or alternatively be used to search for images stored on the electronic device 101 itself, such as images stored in the memory 130 of the electronic device 101.

It should be noted that the functions shown in or described with respect to FIGS. 2A through 4 can be implemented in an electronic device 101, server 106, or other device(s) in any suitable manner. For example, in some embodiments, at least some of the functions shown in or described with respect to FIGS. 2A through 4 can be implemented or supported using one or more software applications or other software instructions that are executed by the processor 120 of the electronic device 101, server 106, or other device(s). In other embodiments, at least some of the functions shown in or described with respect to FIGS. 2A through 4 can be implemented or supported using dedicated hardware components. In general, the functions shown in or described with respect to FIGS. 2A through 4 can be performed using any suitable hardware or any suitable combination of hardware and software/firmware instructions.

Figure 5:
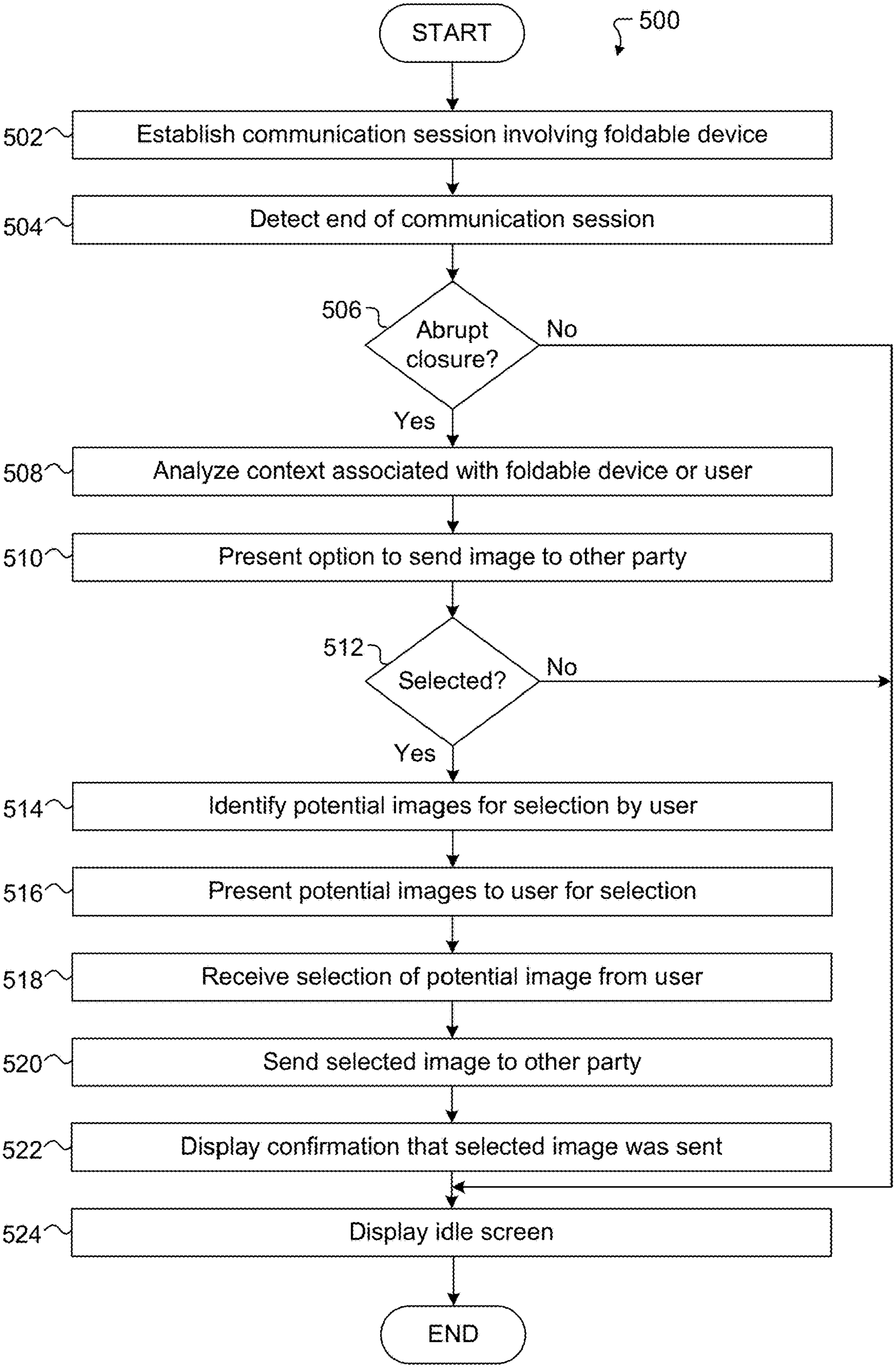
FIG. 5 illustrates an example method for post-call image sharing via a secondary display of an electronic device in accordance with this disclosure.

FIG. 5 illustrates an example method 500 for post-call image sharing via a secondary display of an electronic device in accordance with this disclosure. For ease of explanation, the method 500 shown in FIG. 5 is described as being implemented on or supported by the electronic device 101 in the network configuration 100 of FIG. 1. However, the method 500 shown in FIG. 5 could be implemented on or supported by any other suitable device(s) and in any other suitable system(s).

As shown in FIG. 5, a communication session involving a foldable device is established at step 502. This may include, for example, the processor 120 of the electronic device 101 establishing a voice telephone call, video call, or other communication session with at least one other party. An end of the communication session is detected at step 504. This may include, for example, the processor 120 of the electronic device 101 determining that the voice telephone call, video call, or other communication session has been terminated, such as by a user of the electronic device 101 or by another party involved with the communication session.

Figure 6:
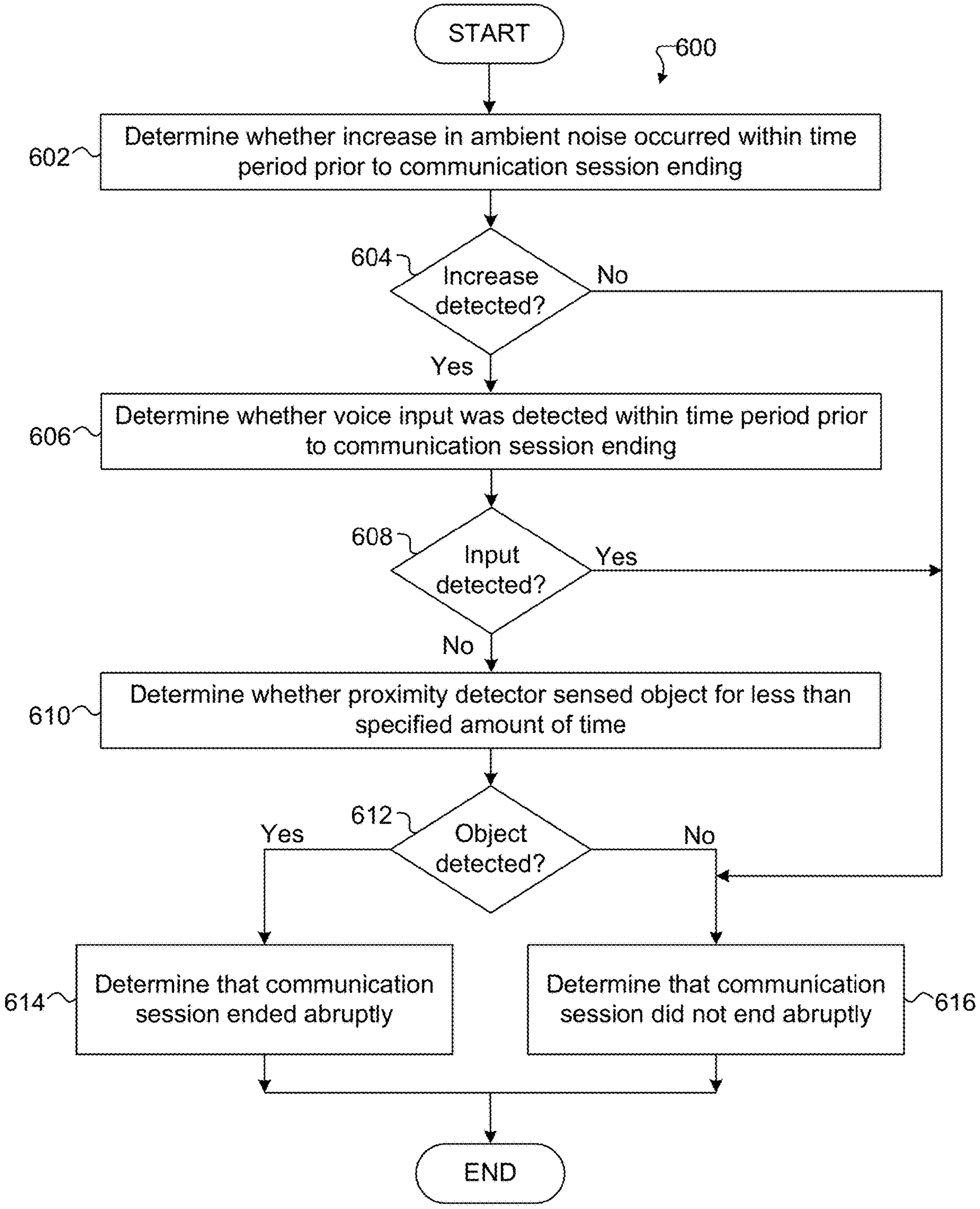
FIG. 6 illustrates an example method for determining whether a communication session ends abruptly in accordance with this disclosure.

A determination is made whether the communication session ended with an abrupt closure of the electronic device at step 506. This may include, for example, the processor 120 of the electronic device 101 determining whether one or more criteria indicative of an abrupt closure of the electronic device 101 are present. One example technique for determining whether the communication session ended with an abrupt closure of the electronic device 101 is shown in FIG. 6, which is described below. If an abrupt closure of the electronic device is not detected, an idle screen is displayed on a secondary display of the electronic device at step 524. This may include, for example, the processor 120 of the electronic device 101 displaying the current time and date on the secondary display 160*b*.

Figure 7:
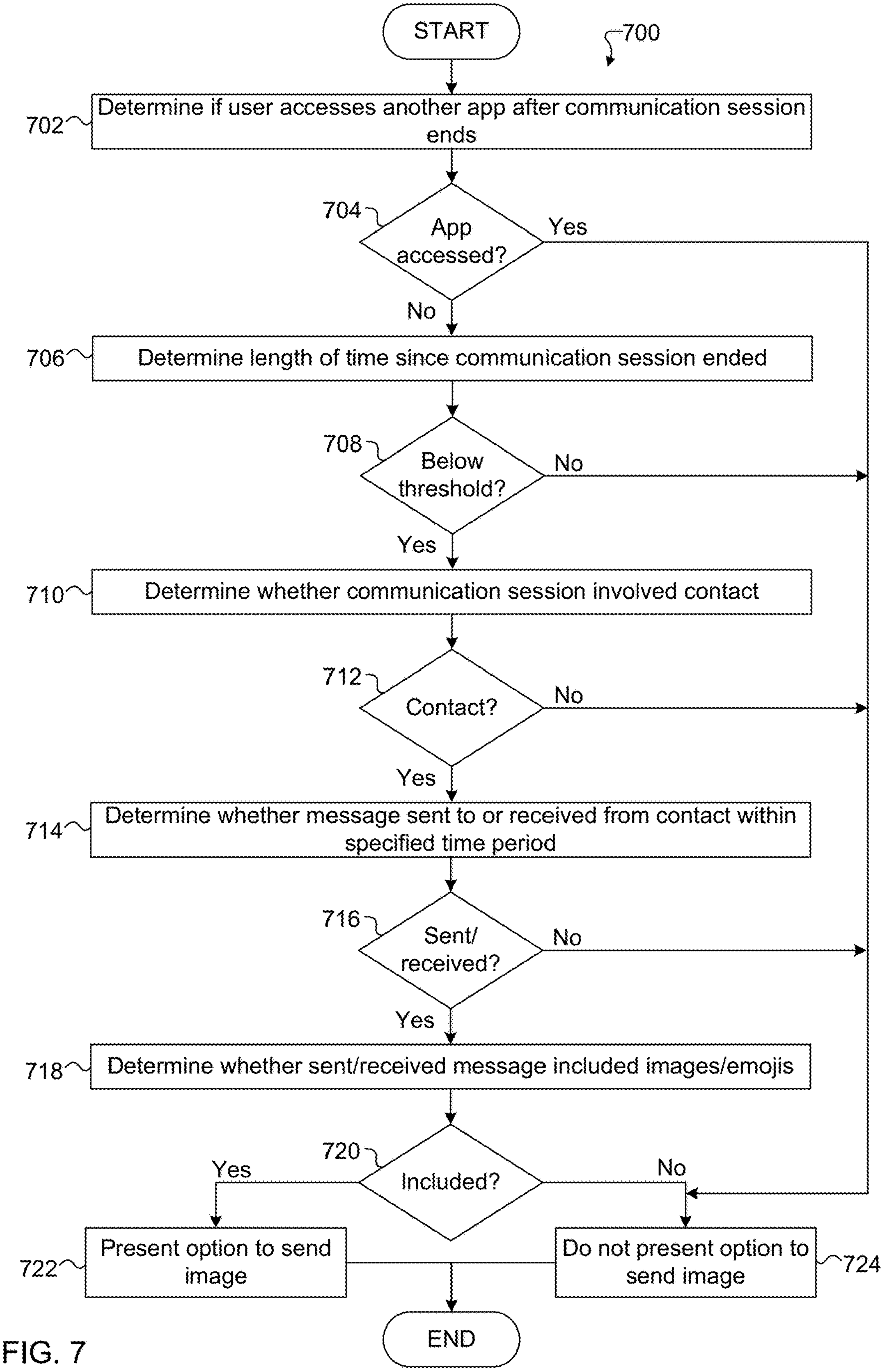
FIG. 7 illustrates an example method for identifying a context associated with an electronic device or a user of the electronic device in accordance with this disclosure.

If an abrupt closure of the electronic device is detected, a context associated with the electronic device or the user of the electronic device is analyzed at step 508. This may include, for example, the processor 120 of the electronic device 101 using the context awareness engine 300 to identify various contextual information about the electronic device 101 or the user. One example technique for analyzing contextual information is shown in FIG. 7, which is described below. If appropriate (such as based on the context), an option is presented allowing the user of the electronic device to send at least one image to another party involved with the communication session at step 510. This may include, for example, the processor 120 of the electronic device 101 causing the secondary display 160*b* to present an indictor 208 showing that the user may swipe left or right in order to send one or more images. A determination is made if the option is selected at step 512. This may include, for example, the processor 120 of the electronic device 101 determining whether the user swiped left or right on the secondary display 160*b*. If not, the idle screen is displayed on the secondary display of the electronic device at step 524.

Figure 8A:
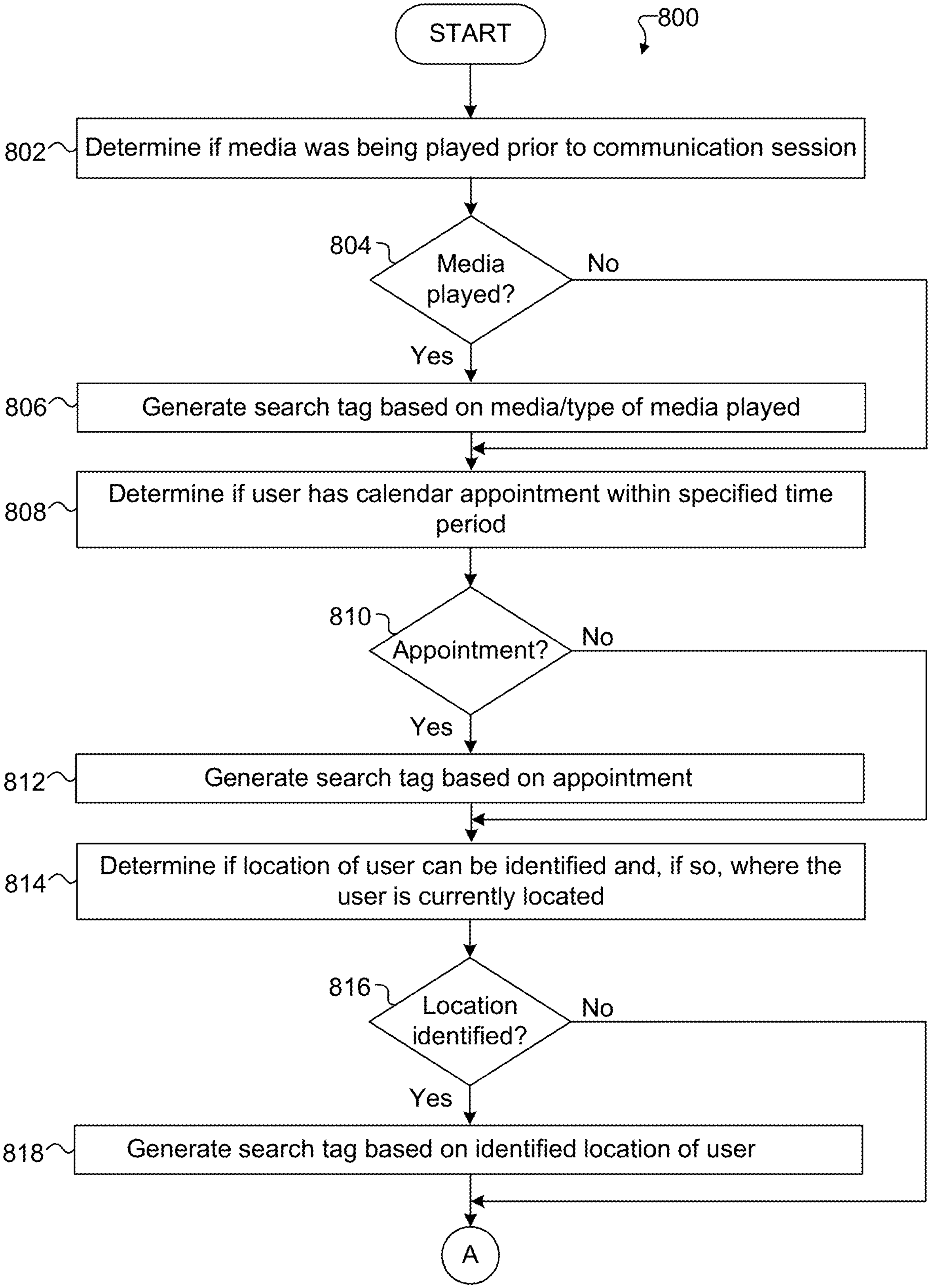
FIGS. 8A and 8B illustrate an example method for generating image queries in accordance with this disclosure.
Figure 8B:
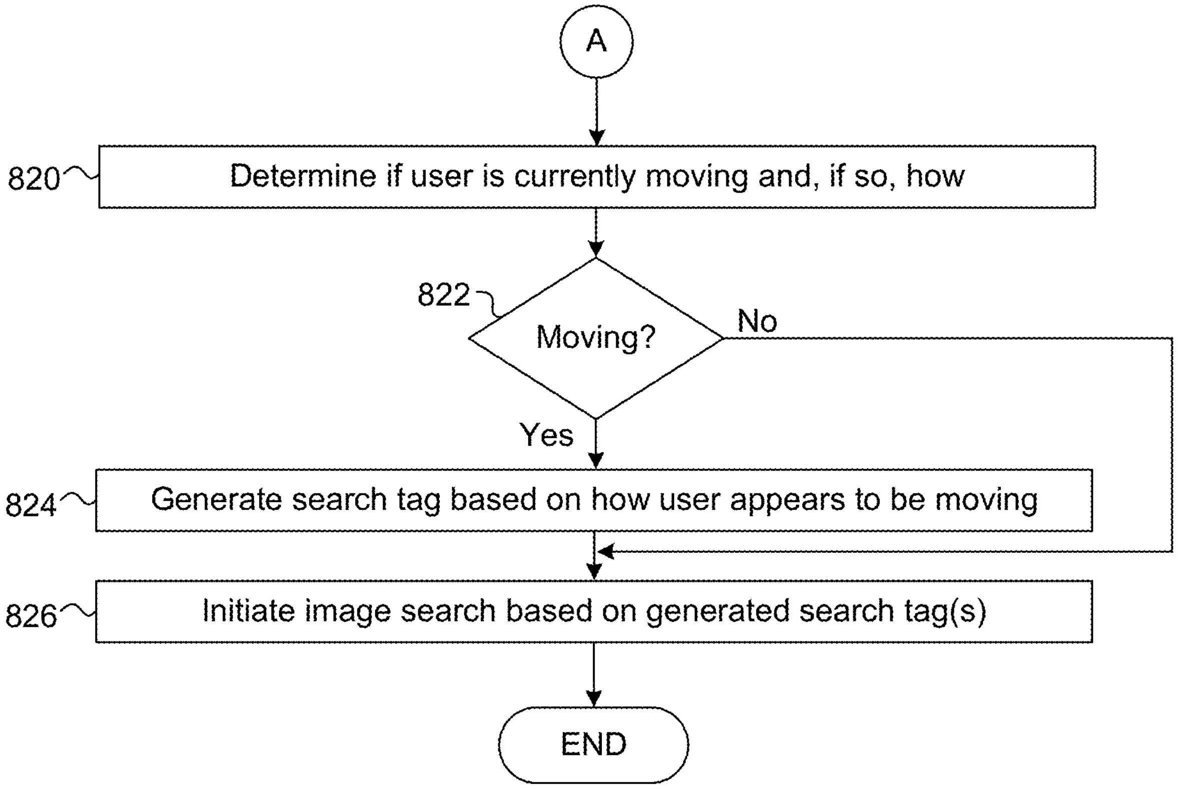

If the option is selected, multiple images that may be selected by the user are identified at step 514 and presented to the user at step 516. This may include, for example, the processor 120 of the electronic device 101 generating one or more queries for obtaining images 210 from an internal memory 130 or at least one external source, such as by using the process shown in FIG. 4. One example technique for generating image queries is shown in FIGS. 8A and 8B, which are described below. This may also include the processor 120 of the electronic device 101 displaying potential images 210 on the secondary display 160*b* of the electronic device 101 for selection by the user. A selection of at least one image is received from the user at step 518. This may include, for example, the processor 120 of the electronic device 101 sensing the user tapping on or otherwise selecting one or more images 210 displayed on the secondary display 160*b* of the electronic device 101 and sensing the user tapping on or otherwise selecting the icon 212 to trigger sending of the selected image(s) 210.

The selected image or images are sent to the other party involved with the communication session at step 520. This may include, for example, the processor 120 of the electronic device 101 generating a text message or other message including the selected image(s) 210 and transmitting the message to an electronic device associated with the other party. A confirmation that the selected image or images were sent is displayed on the electronic device at step 522. This may include, for example, the processor 120 of the electronic device 101 displaying text indicating that the selected image or images were sent to the other party. The idle screen is displayed on the secondary display of the electronic device at step 524.

Although FIG. 5 illustrates one example of a method 500 for post-call image sharing via a secondary display 160*b* of an electronic device 101, various changes may be made to FIG. 5. For example, while shown as a series of steps, various steps in FIG. 5 may overlap, occur in parallel, occur in a different order, or occur any number of times (including zero times).

FIG. 6 illustrates an example method 600 for determining whether a communication session ends abruptly in accordance with this disclosure. For ease of explanation, the method 600 shown in FIG. 6 is described as being implemented on or supported by the electronic device 101 in the network configuration 100 of FIG. 1. However, the method 600 shown in FIG. 6 could be implemented on or supported by any other suitable device(s) and in any other suitable system(s).

As shown in FIG. 6, a determination is made whether an increase in ambient noise occurred within a time period prior to a communication session ending at step 602. This may include, for example, the processor 120 of the electronic device 101 using input from a microphone or other audio sensor 180 to measure ambient noise in an environment around the electronic device 101. An increase in ambient noise might indicate, for instance, that a siren started sounding or train noise was increasing prior to the end of the communication session. In some cases, the time period used here may be about ten seconds (although other time periods may be used and might be user-configurable or dynamically adjustable). If a determination is made that an increase in ambient noise was not detected at step 604, a decision is made that the communication session did not end abruptly at step 616.

If a determination is made that an increase in ambient noise was detected, a determination is made whether voice input was detected within a time period prior to the communication session ending at step 606. This may include, for example, the processor 120 of the electronic device 101 using input from the microphone or other audio sensor 180 to determine whether the user of the electronic device 101 stopped talking or whether the electronic device 101 was otherwise unable to capture voice input from the user. Again, in some cases, the time period used here may be about ten seconds (although other time periods may be used and might be user-configurable or dynamically adjustable). If a determination is made that voice input was detected at step 608, the decision is made that the communication session did not end abruptly at step 616.

If a determination is made that voice input was not detected, a determination is made whether a proximity sensor of the electronic device detected an object for less than a specified amount of time at step 610. This may include, for example, the processor 120 of the electronic device 101 using input from a proximity sensor 180 to determine whether the proximity sensor 180 detects any object near the electronic device 101 and, if so, for how long. This may be useful, for instance, to determine whether the user placed the electronic device 101 down so that the secondary display **160*b* is not visible. In some cases, the specified amount of time may be about three seconds (although other specified amounts of time may be used and might be user-configurable or dynamically adjustable). If a determination is made that the proximity sensor of the electronic device detected an object for less than the specified amount of time at step 612, a decision is made that the communication session ended abruptly at step 614. Otherwise, the decision is made that the communication session did not end abruptly at step 616**.

Although FIG. 6 illustrates one example of a method 600 for determining whether a communication session ends abruptly, various changes may be made to FIG. 6. For example, while shown as a series of steps, various steps in FIG. 6 may overlap, occur in parallel, occur in a different order, or occur any number of times (including zero times). Also, while FIG. 6 illustrates one specific example combination of conditions for determining whether a communication session ends abruptly, other individual conditions or combinations of conditions (including one or more conditions not shown here) may be used.

FIG. 7 illustrates an example method 700 for identifying a context associated with an electronic device or a user of the electronic device in accordance with this disclosure. For ease of explanation, the method 700 shown in FIG. 7 is described as being implemented on or supported by the electronic device 101 in the network configuration 100 of FIG. 1. However, the method 700 shown in FIG. 7 could be implemented on or supported by any other suitable device(s) and in any other suitable system(s).

As shown in FIG. 7, a determination is made whether a user of an electronic device accesses an application after a communication session ends at step 702. This may include, for example, the processor 120 of the electronic device 101 determining whether the user of the electronic device 101 initiated or otherwise opened or started interacting with an application of the electronic device 101 immediately or soon after the communication session ended. If a determination is made that the user accesses an application at step 704, a decision is made to not present an option of sending an image to another party involved with the communication session at step 724. Otherwise, the length of time since the communication session ended is determined at step 706. This may include, for example, the processor 120 of the electronic device 101 determining the difference between the current time and the time that the communication session ended. A determination is made whether the amount of time is below a threshold at step 708. This may include, for example, the processor 120 of the electronic device 101 comparing the identified amount of time to a three-second threshold (although other thresholds may be used and might be user-configurable or dynamically adjustable). If the identified amount of time is above the threshold, the decision is made to not present the option of sending an image to the other party involved with the communication session at step 724.

If the amount of time is below the threshold, a determination is made whether the communication session that ended involved one of the user's contacts at step 710. This may include, for example, the processor 120 of the electronic device 101 determining whether the name, phone number, or other information associated with the other party to the communication session matches a contact of the user stored on the electronic device 101. If it is determined that the communication session did not involve one of the user's contacts at step 712, the decision is made to not present the option of sending an image to the other party involved with the communication session at step 724.

If the communication session involved one of the user's contacts, a determination is made whether the user has sent a message to the other party or received a message from the other party within a specified time period at step 714. This may include, for example, the processor 120 of the electronic device 101 determining whether the user previously sent a text message or other message to the user's contact or has received a text message or other message from the user's contact within the past twenty-four hours (although other time periods may be used and might be user-configurable or dynamically adjustable). If it is determined that the user has not recently sent or received a message to or from the other party at step 716, the decision is made to not present the option of sending an image to the other party involved with the communication session at step 724.

If it is determined that the user has recently sent or received a message to or from the other party, a determination is made whether the message or messages sent to or received from the other party included one or more images, emojis, or other graphical content at step 718. This may include, for example, the processor 120 of the electronic device 101 parsing the previously-sent or previously-received message(s) to determine whether one or more images, emojis, or other graphical content is included. If it is determined that the previously-sent or previously-received message(s) included graphical content at step 720, a decision is made to present the option of sending an image to the other party involved with the communication session at step 722. Otherwise, the decision is made to not present the option of sending an image to the other party involved with the communication session at step 724.

Although FIG. 7 illustrates one example of a method 700 for identifying a context associated with an electronic device 101 or a user of the electronic device 101, various changes may be made to FIG. 7. For example, while shown as a series of steps, various steps in FIG. 7 may overlap, occur in parallel, occur in a different order, or occur any number of times (including zero times). Also, while FIG. 7 illustrates one specific example combination of contextual information types related to the electronic device 101 or the user that may be used, other individual contextual information types or combinations of contextual information types (including one or more types not shown here) may be used.

FIGS. 8A and 8B illustrate an example method 800 for generating image queries in accordance with this disclosure. For ease of explanation, the method 800 shown in FIGS. 8A and 8B is described as being implemented on or supported by the electronic device 101 in the network configuration 100 of FIG. 1. However, the method 800 shown in FIGS. 8A and 8B could be implemented on or supported by any other suitable device(s) and in any other suitable system(s).

As shown in FIGS. 8A and 8B, a determination is made whether media content was being played by an electronic device prior to a communication session at step 802. This may include, for example, the processor 120 of the electronic device 101 determining whether a song, movie, television show, podcast, or streaming content was being presented to the user of the electronic device 101 prior to the communication session (such as immediately before the communication session started). If it is determined that media was being played at step 804, a search tag is generated based on the media or type of media being played at step 806. This may include, for example, the processor 120 of the electronic device 101 generating a search tag for a movie or television show's name, an actor/actress' name, a song's name, an artist's name, or other tag related to the media or type of media being played.

A determination is made whether the user of the electronic device has an appointment within a specified time period from the current time at step 808. This may include, for example, the processor 120 of the electronic device 101 determining whether the user has an appointment in his or her calendar that starts within one hour from the current time (although other time periods may be used and might be user-configurable or dynamically adjustable). In some cases, this may be limited to determining whether an upcoming appointment in the user's calendar involves the other party to the communication session that just ended. If it is determined that the user has an upcoming appointment at step 810, a search tag is generated based on the upcoming appointment at step 812. This may include, for example, the processor 120 of the electronic device 101 generating a search tag for the phrase "running late" or (if the appointment involves the other party to the communication session) a search tag for the phrase "see you soon."

A determination is made whether a specific location of the user (or the user's electronic device) can be identified and, if so, where the user (or the user's electronic device) is currently located at step 814. This may include, for example, the processor 120 of the electronic device 101 determining whether the user or the electronic device 101 is currently located at a position associated with the user's home or workplace. If a type of location can be identified at step 816, a search tag is generated based on the identified location at step 818. This may include, for example, the processor 120 of the electronic device 101 generating a search tag for a phrase like "at home" or "working."

A determination is made whether the user (or the user's electronic device) is currently moving and, if so, how the user (or the user's electronic device) is moving at step 820. This may include, for example, the processor 120 of the electronic device 101 using the speed of location changes associated with the user or the electronic device 101, accelerometer measurements at the electronic device 101, or other information to detect whether the user is generally stationary, walking, running, riding a bike, or driving. If a type of movement can be identified at step 822, a search tag is generated based on the identified type of movement at step 824. This may include, for example, the processor 120 of the electronic device 101 generating a search tag for a phrase like "walking," "running," "biking," or "driving."

A search is initiated based on the one or more generated search tags at step 826. This may include, for example, the processor 120 of the electronic device 101 constructing a search query to look for images 210 that have been annotated or labeled with tags that match, are similar to, or are otherwise associated with the one or more generated search tags. As noted above, the search for images 210 may be performed internally to the electronic device 101, external to the electronic device 101, or both.

Although FIGS. 8A and 8B illustrate one example of a method 800 for generating image queries, various changes may be made to FIGS. 8A and 8B. For example, while shown as a series of steps, various steps in FIGS. 8A and 8B may overlap, occur in parallel, occur in a different order, or occur any number of times (including zero times). Also, while FIGS. 8A and 8B illustrate one specific example combination of contextual information types used to identify images 210, other individual contextual information types or combinations of contextual information types (including one or more types not shown here) may be used.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

detecting, by an electronic device, a closure of the electronic device into a closed configuration that ends a communication session involving a user of the electronic device;

generating, by the electronic device, a query comprising at least one search tag in response to the electronic device detecting the closure;

obtaining multiple images in response to the query;

simultaneously displaying, on an external display of the electronic device viewable when the electronic device is in the closed configuration and based on a context associated with at least one of the electronic device or the user, the multiple images for selection by the user;

receiving a selection by the user of at least one of the displayed images; and initiating transmission of the at least one selected image to another electronic device associated with another party involved with the communication session.

2. The method of claim 1, further comprising:

determining, after detecting the closure of the electronic device, whether the electronic device was closed abruptly;

wherein the multiple images are displayed after determining that the electronic device was closed abruptly.

3. The method of claim 2, wherein a determination is made that the electronic device was closed abruptly based on at least one of:

a determination that ambient noise in an environment around the electronic device was increasing in a time period prior to the communication session ending;

a determination that voice input was not received by the electronic device in the time period prior to the communication session ending; or a determination that an object was detected by a proximity sensor of the electronic device for less than a specified amount of time after the communication session ended.

4. The method of claim 1, further comprising:

determining the context associated with at least one of the electronic device or the user;

wherein determining the context comprises at least one of:

determining whether the user accesses an application of the electronic device after the communication session ended;

determining whether a specified amount of time has elapsed since the communication session ended;

determining whether the other party involved with the communication session is identified by a contact stored on the electronic device;

determining whether a message had previously been sent to or received from the other party during a specified time period prior to the communication session; or determining whether a prior message sent to or received from the other party contained one or more images or emojis.

5. The method of claim 1, wherein the at least one search tag includes at least one of:

a search tag based on media or type of media being played by the electronic device prior to the communication session;

a search tag based on whether the user has an upcoming appointment in a calendar of the user;

a search tag based on a location of the user; or a search tag based on how the user is moving.

6. The method of claim 1, further comprising:

displaying, on the external display of the electronic device, a confirmation that the at least one selected image has been sent; and after displaying the confirmation, displaying, on the external display of the electronic device, an idle screen.

7. The method of claim 1, further comprising:

initiating transmission of the search query comprising the at least one search tag to a search engine;

wherein the multiple images are obtained from the search engine.

8. An electronic device comprising:

an internal display viewable when the electronic device is in an open configuration;

an external display viewable when the electronic device is in a closed configuration; and at least one processor configured to:

detect a closure of the electronic device into the closed configuration that ends a communication session involving a user of the electronic device;

generate a query comprising at least one search tag in response to the detection of the closure;

obtain multiple images in response to the query;

simultaneously display, on the external display and based on a context associated with at least one of the electronic device or the user, the multiple images for selection by the user;

receive a selection by the user of at least one of the displayed images; and initiate transmission of the at least one selected image to another electronic device associated with another party involved with the communication session.

9. The electronic device of claim 8, wherein:

the at least one processor is further configured to determine, after detecting the closure of the electronic device, whether the electronic device was closed abruptly; and the at least one processor is configured to display the multiple images after determining that the electronic device was closed abruptly.

10. The electronic device of claim 9, wherein, to determine that the electronic device was closed abruptly, the at least one processor is configured to at least one of:

make a determination that ambient noise in an environment around the electronic device was increasing in a time period prior to the communication session ending;

make a determination that voice input was not received by the electronic device in the time period prior to the communication session ending; or make a determination that an object was detected by a proximity sensor of the electronic device for less than a specified amount of time after the communication session ended.

11. The electronic device of claim 8, wherein:

the at least one processor is further configured to determine the context associated with at least one of the electronic device or the user; and to determine the context, the at least one processor is configured to at least one of:

determine whether the user accesses an application of the electronic device after the communication session ended;

determine whether a specified amount of time has elapsed since the communication session ended;

determine whether the other party involved with the communication session is identified by a contact stored on the electronic device;

determine whether a message had previously been sent to or received from the other party during a specified time period prior to the communication session; or determine whether a prior message sent to or received from the other party contained one or more images or emojis.

12. The electronic device of claim 8, wherein the at least one search tag includes at least one of:

a search tag based on media or type of media being played by the electronic device prior to the communication session;

a search tag based on whether the user has an upcoming appointment in a calendar of the user;

a search tag based on a location of the user; or a search tag based on how the user is moving.

13. The electronic device of claim 8, wherein the at least one processor is further configured to:

display, on the external display of the electronic device, a confirmation that the at least one selected image has been sent; and after displaying the confirmation, display, on the external display of the electronic device, an idle screen.

14. The electronic device of claim 8, wherein:

the at least one processor is further configured to initiate transmission of the search query comprising the at least one search tag to a search engine; and the at least one processor is configured to obtain the multiple images from the search engine.

15. A non-transitory computer readable medium containing instructions that when executed cause at least one processor of an electronic device to:

detect a closure of the electronic device into a closed configuration that ends a communication session involving a user of the electronic device;

generate a query comprising at least one search tag in response to the detection of the closure;

obtain multiple images in response to the query;

simultaneously display, on an external display of the electronic device viewable when the electronic device is in the closed configuration and based on a context associated with at least one of the electronic device or the user, the multiple images for selection by the user;

receive a selection by the user of at least one of the displayed images; and initiate transmission of the at least one selected image to another electronic device associated with another party involved with the communication session.

16. The non-transitory computer readable medium of claim 15, further containing instructions that when executed cause the at least one processor to determine, after detecting the closure of the electronic device into the closed configuration, whether the electronic device was closed abruptly;

wherein the instructions that when executed cause the at least one processor to display the multiple images comprise instructions that when executed cause the at least one processor to display the multiple images after determining that the electronic device was closed abruptly.

17. The non-transitory computer readable medium of claim 16, wherein the instructions that when executed cause the at least one processor to determine that the electronic device was closed abruptly comprise:

instructions that when executed cause the at least one processor to at least one of:

make a determination that ambient noise in an environment around the electronic device was increasing in a time period prior to the communication session ending;

make a determination that voice input was not received by the electronic device in the time period prior to the communication session ending; or make a determination that an object was detected by a proximity sensor of the electronic device for less than a specified amount of time after the communication session ended.

18. The non-transitory computer readable medium of claim 15, further containing instructions that when executed cause the at least one processor to determine the context associated with at least one of the electronic device or the user;

wherein the instructions that when executed cause the at least one processor to determine the context comprise instructions that when executed cause the at least one processor to at least one of:

determine whether the user accesses an application of the electronic device after the communication session ended;

determine whether a specified amount of time has elapsed since the communication session ended;

determine whether the other party involved with the communication session is identified by a contact stored on the electronic device;

determine whether a message had previously been sent to or received from the other party during a specified time period prior to the communication session; or determine whether a prior message sent to or received from the other party contained one or more images or emojis.

19. The non-transitory computer readable medium of claim 15, wherein the at least one search tag includes at least one of:

a search tag based on media or type of media being played by the electronic device prior to the communication session;

a search tag based on whether the user has an upcoming appointment in a calendar of the user;

a search tag based on a location of the user; or a search tag based on how the user is moving.

20. The non-transitory computer readable medium of claim 15, further containing instructions that when executed cause the at least one processor to initiate transmission of the search query comprising the at least one search tag to a search engine.

* * * * *